United States Patent Office 3,145,202
Patented Aug. 18, 1964

3,145,202
PROCESS FOR THE PRODUCTION OF
19-HYDROXY-Δ⁴-3-KETO STEROIDS
Albert Bowers, Mexico City, Mexico, assignor to Syntex Corporation, Panama, Panama, a corporation of Panama
No Drawing. Filed June 12, 1962, Ser. No. 201,802
Claims priority, application Mexico May 16, 1962
14 Claims. (Cl. 260—239.55)

The present invention relates to a new process for the preparation of cyclopentanophenanthrene derivatives.

More particularly, the present invention relates to a process for the production of Δ⁴-3-keto-19-hydroxy steroids from the corresponding Δ⁵-3,19-dihydroxy steroids.

The obtainment of the Δ⁴-3-keto-19-hydroxy steroids is of great utility, for these are valuable intermediate compounds in the production of the corresponding 19-nor derivatives which are of importance as is well known to those skilled in the art.

The conversion of the Δ⁴-3-keto-19-hydroxy steroids into the corresponding 19-nor derivatives thereof is a known reaction, for example: the treatment of the respective androstane and pregnene derivatives with a strong base, which affords the corresponding 19-nor derivatives, has been described by G. Winston Barber et al., J. Org. Chem., 20, 1253, (1955), A. S. Meyer Experientia, 11, 99, (1955) and has been the object of U.S. Patent No. 3,013,025 and of British Patents Nos. 820,780 and 853,851.

The process of converting Δ⁵-3-hydroxy steroids into Δ⁴-3-ketones by the Oppenauer method has been known for a long time, but in accordance with the present invention the surprising discovery has been made that when this method is applied within the conditions hereinafter described in detail, to the Δ⁵-3,19-dihydroxy steroids, the hydroxyl group at C–19 is maintained without suffering any transformation, thus being only oxidized the Δ⁵-3-hydroxy grouping to Δ⁴-3-keto in a quantitative yield.

The new process object of the present invention is illustrated by the following equation:

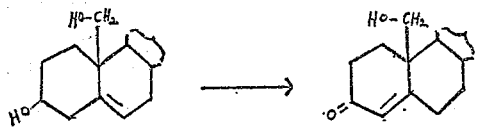

The starting compound (I) of the process just outlined, is obtained in accordance with my copending patent application Serial No. 194,716 filed May 14, 1962, now U.S. Patent No. 3,065,228, by treatment of the corresponding 3-hydroxy-5α-bromo-6β,19-oxido steroids, with zinc in a lower aliphatic alcohol, thus being obtained the corresponding 3,19-dihydroxy-Δ⁵ steroid, which is the starting compound of the present process. This derivative may belong to the pregnane, androstane and sapogenin series, and a number of substituents may be present in the molecule without interfering with the reaction. For example, at C–17 there may be present a ketone group, a 17β-acyloxy group, a 17β-hydroxy group with or without a substituent at C–17α, a 17β-acetyl group with or without an acyloxy group at C–17α, a dihydroxy acetone side chain preferably protected by a 17,20;20,21-bismethylenedioxy group or a sapogenin side chain. At C–11 there may be present a ketone group or a hydroxyl group, at C–16 a ketone group, a hydroxyl group, an α or β-methyl group, a double bond between C–16 and C–17 and other similar substituents.

In accordance with the present invention a starting compound of the type described hereinbefore, is treated with an aluminum lower alkoxide, preferably aluminum isopropoxide, and a lower aliphatic ketone, preferably cyclohexanone, in an organic solvent inert to these reagents, such as non-polar organic solvents, preferably aromatic homocyclic solvents and especially toluene, preferably at reflux temperature for a period of time of approximately from 5 to 15 minutes, the optimum results being produced at about 10 minutes, thus being obtained the corresponding 19-hydroxy-Δ⁴-3-keto steroid (II). The isolation of the final product of this reaction has no critical importance and may be carried out by steam distillation of the organic solvents and subsequent extraction of the resulting aqueous suspension with organic solvents not miscible with water, such as methylene chloride, chloroform, ethyl acetate, etc. followed by a washing of the organic extracts, successively with acid solutions, basic solutions and with water until neutral. The drying, evaporation and crystallization of the residue may be carried out in conventional manner.

Other isolation methods such as the dilution of the reacting mixture with slightly polar organic solvents, subsequent filtering of the impurities, followed by washing of the organic solutions in a manner similar as specified hereinbefore, and similar methods, may be applied at the end of the reaction.

Examples of compounds which may be obtained by the process of the present invention are: Δ⁴-pregnen-19-ol-3,20-dione, 16α-methyl-Δ⁴-pregnen-19-ol-3,20-dione, 16β-methyl-Δ⁴-pregnen-19-ol-3,20 dione, 16α,17α-isopropylidenedioxy-Δ⁴-pregnen-19-ol-3,20-dione, the 17-acetate of Δ⁴-pregnene-17α,19-diol-3,20-dione, Δ⁴,¹⁶-pregnadiene-19-ol-3,20-dione, 17,20,20,21-bismethylenedioxy-Δ⁴-pregnen-19-ol-3,11-dione, Δ⁴-androsten-19-ol-3,17-dione, 17α-methyl-Δ⁴-androstene-17β,19-diol-3-one, 17α-vinyl-Δ⁴-androstene-17β,19-diol-3-one, 17α-ethinyl-Δ⁴-androstene-17β,19-diol-3-one, the 17-acetate of 17α-ethinyl-Δ⁴-androstene-17β,19-diol-3-one, and similar compounds.

The following specific examples are intended to illustrate our invention but do not restrict its scope.

PREPARATION 1

There were suspended 10 g. of diosgenin acetate in 10 cc. of dioxane, 12 cc. of 0.46 N perchloric acid were added and then 4 g. of N-bromoacetamide; the N-bromoacetamide was added little by little with stirring, in a period of time of 1 hour in the absence of light and at a temperature of around 15° C. Stirring was continued for an additional hour in the dark and at room temperature; the mixture was then decolorated by addition of a 10% aqueous solution of sodium bisulfite, 1 lt. of water was added and the mixture was extracted with methylene chloride; the extract was washed with water, dried over anhydrous sodium sulfate and the solvent was evaporated under reduced pressure at room temperature. The residue consisted of the 3-acetate of 5α-bromo-6β-hydroxy-tigogenin.

To a solution of 4 g. of the latter compound in 150 cc. of dry benzene were added 6 g. of lead tetraacetate and the mixture was refluxed for 18 hours. It was then cooled, filtered, water was added to the filtrate, the benzene layer was separated, washed with water and the benzene evaporated under reduced pressure; by chromatography of the residue on neutral alumina there was obtained the acetate of 5α-bromo-6β,19-oxido-tigogenin.

There were mixed 4 g. of the latter compound with 20 g. of zinc powder and 200 cc. of ethanol and the mixture was refluxed for 16 hours. The mixture was filtered through celite and the filtrate evaporated to dryness. By crystallization of the residue from acetone-hexane there was obtained the 3-acetate of 19-hydroxy-diosgenin.

There were dissolved 2 g. of the latter acetate in 50 cc. of methanol and were treated with 5 cc. of a 4% aqueous solution of potassium hydroxide; the reacting mixture was stirred at 0° C. for 1 hour under nitrogen atmosphere, the mixture was neutralized with acetic acid and the methanol was distilled under reduced pressure. The residue was triturated with water, filtered and the solid was washed with water, dried, and by crystallization from ethyl acetate-methanol there was obtained 19-hydroxy diosgenin.

PREPARATION 2

A solution of 5 g. of $\Delta^5$-androstene-3$\beta$,19-diol-17-one (obtained in accordance with my copending patent application Serial No. 194,716, filed May 14, 1962, now U.S. Patent No. 3,065,228) in 250 cc. of thiophene-free benzene was treated with 27.5 cc. of a 4 N-ether solution of methyl magnesium bromide and the mixture was refluxed for 3 hours in the absence of moisture. The cooled mixture was cautiously treated with an excess of aqueous solution of ammonium chloride and the product was isolated by extraction with ethyl acetate.

The extract was washed with water, dried over anhydrous sodium sulfate and evaporated to dryness.

By recrystallization from methylene chloride-hexane there was obtained 17$\alpha$-methyl-$\Delta^5$-androstene-3$\beta$,17$\beta$,19-triol.

$\Delta^5$-androstene-3$\beta$,19-diol-17-one was treated in accordance with the above procedure, except that methyl magnesium bromide was substituted by ethinyl magnesium bromide and by vinyl magnesium bromide giving respectively 17$\alpha$-ethinyl-$\Delta^5$-androstene-3$\beta$,17$\beta$,19-triol and 17$\alpha$-vinyl-$\Delta^5$-androstene-3$\beta$,17$\beta$,19-triol.

PREPARATION 3

A mixture of 1 g. of 17$\alpha$-ethinyl-$\Delta^5$-androstene-3$\beta$,17$\beta$,19-triol, 1 g. of p-toluenesulfonic acid, 50 cc. of acetic acid and 25 cc. of acetic anhydride was kept at room temperature for 24 hours. Then it was poured into water and stirred until the excess anhydride was hydrolyzed. The product was isolated by addition of methylene chloride, and by crystallization of the residue from acetone-ether, there was obtained the tri-acetate of 17$\alpha$-ethinyl-$\Delta^5$-androstene-3$\beta$,17$\beta$,19-triol.

To a solution of 1 g. of the latter tri-acetate in 100 cc. of methanol, was added 1 gram of potassium carbonate dissolved in 10 cc. of water. The resulting mixture was kept for 2 hours at room temperature, then it was neutralized with approximately 1 cc. of acetic acid and concentrated to a small volume. Water was added and the product extracted with ethyl acetate. The extract was washed with water, dried over anhydrous sodium sulfate and evaporated to dryness. By crystallization from acetone-hexane there was obtained the 17-acetate of 17$\alpha$-ethinyl-$\Delta^5$-androstene-3$\beta$,17$\beta$,19-triol.

*Example I*

A solution of 1 g. of $\Delta^5$-androstene-3$\beta$,19-diol-17-one in 10 cc. of toluene and 2 cc. of cyclohexanon, was dried by distillation of 3 cc. of the solvent mixture, there was added a solution of 250 mg. of aluminum isopropoxide dissolved in 2 cc. of anhydrous toluene and ½ cc. of cyclohexanone and the mixture was refluxed for 10 minutes; there was added 1 cc. of acetic acid and the solvents were eliminated by steam distillation. The product was extracted several times with ethyl acetate and the organic extracts were washed with a 5% hydrochloric acid soluiton, then with water, 10% sodium carbonate solution and water to neutral, dried over anhydrous sodium sulfate and evaporated to dryness. By crystallization from acetone-hexane there was obtained the $\Delta^4$-androsten-19-ol-3,17-dione, in 80% yield.

*Example II*

$\Delta^5$-androstene-3$\beta$,19-diol-17-one was treated in accordance with Example I except that toluene was substituted by benzene, thus giving $\Delta^4$-androsten-19-ol-3,17-dione, in 75% yield.

*Example III*

$\Delta^5$-androstene-3$\beta$,19-diol-17-one was treated according to Example I except that toluene was substituted by xylene, thus being obtained $\Delta^4$-androsten-19-ol-3,17-dione in 73% yield.

*Example IV*

$\Delta^5$-androstene-3$\beta$,19-diol-17-one was treated following the procedure described in Example I with the exception that the refluxing time was of 15 minutes, thus being produced $\Delta^4$-androsten-19-ol-3,17-dione, in 78% yield.

*Example V*

$\Delta^5$-androstene-3$\beta$,19-diol-17-one was treated according to Example I but methylethyl ketone was used instead of cyclohexanone, thus being obtained a compound identical with the one obtained in such example.

*Example VI*

$\Delta^5$-androstene-3$\beta$,19-diol-17-one was treated according to Example I, except that aluminum isopropoxide was substituted by aluminum terbutoxide, thus being obtained a compound identical with the one of said example.

*Example VII*

The compounds listed under I (obtained according to my copending patent application Serial No. 194,716, filed May 14, 1962, now U.S. Patent No. 3,065,228) were treated in accordance with Example I, thus giving the respective products set forth under II.

| I | II |
|---|---|
| $\Delta^5$-pregnene-3$\beta$,19-diol-20-one | $\Delta^4$-pregnen-19-ol-3,20-dione. |
| 16$\alpha$-methyl-$\Delta^5$-pregnen-3$\beta$,19-diol-20-one. | 16$\alpha$-methyl-$\Delta^4$-pregnen-19-ol-3,20-dione. |
| 16$\beta$-methyl-$\Delta^5$-pregnen-3$\beta$,19-diol-20-one. | 16$\beta$-methyl-$\Delta^4$-pregnen-19-ol-3,20-dione. |
| 16$\alpha$,17$\alpha$-isopropylidenedioxy-$\Delta^5$-pregnene-3$\beta$,19-diol-20-one. | 16$\alpha$,17$\alpha$-isopropylidenedioxy-$\Delta^4$-pregnen-19-ol-3,20-dione. |
| 17-acetate of $\Delta^5$-pregnen-3$\beta$,17$\alpha$,19-triol-20-one. | 17-acetate of $\Delta^4$-pregnen-17$\alpha$,19-diol-3,20-dione. |
| 17-acetate of 16$\alpha$-methyl-$\Delta^5$-pregnen-3$\beta$,17$\alpha$,19-triol-20-one. | 17-acetate of 16$\alpha$-methyl-$\Delta^4$-pregnene-17$\alpha$,19-diol-3,20-dione. |
| $\Delta^{5,16}$-pregnadiene-3$\beta$,19-diol-20-one. | $\Delta^{4,16}$-pregnadiene-19-ol-3,20-dione. |
| 17,20;20,21-bismethylenedioxy-$\Delta^5$-pregnene-3$\beta$,19-diol-11-one. | 17,20;20,21-bismethylenedioxy-$\Delta^4$-pregnen-19-ol-3,11-dione. |
| 17,20;20,21-bismethylenedioxy-$\Delta^5$-pregnene-3$\beta$,19-diol. | 17,20;20,21-bismethylenedioxy-$\Delta^4$-pregnen-19-ol-3-one. |
| $\Delta^5$-androstene-3$\beta$,17$\beta$,19-triol. | $\Delta^4$-androsten-19-ol-3,17-dione. |
| 19-hydroxy-diosgenin. | 19-hydroxy-diosgenone. |
| 17$\alpha$-methyl-$\Delta^5$-androstene-3$\beta$,17$\beta$,19-triol. | 17$\alpha$-methyl-$\Delta^4$-androstene-17$\beta$,19-diol-3-one. |
| 17-acetate of 17$\alpha$-ethinyl-$\Delta^5$-androstene-3$\beta$,17$\beta$,19-triol. | 17-acetate of 17$\alpha$-ethinyl-$\Delta^4$-androstene-17$\beta$,19-diol-3-one. |
| 17$\alpha$-ethinyl-$\Delta^5$-androstene-3$\beta$,17$\beta$,19-triol. | 17$\alpha$-ethinyl-$\Delta^4$-androstene-17$\beta$,19-diol-3-one. |
| 17$\alpha$-vinyl-$\Delta^5$-androstene-3$\beta$,17$\beta$,19-triol. | 17$\alpha$-vinyl-$\Delta^4$-androstene-17$\beta$,19-diol-3-one. |

I claim:

1. A process for the production of a 19-hydroxy-$\Delta^4$-3-keto steroid, which consists of reacting the corresponding 3,19-dihydroxy-$\Delta^5$-steroid, with an aluminum lower alkoxide and a lower aliphatic ketone in a non-polar organic solvent at reflux temperature for an approximate time of 5 to 15 minutes.

2. The process of claim 1 wherein the starting compound is selected from the group consisting of the androstane, pregnane and sapogenin series.

3. The process of claim 1 wherein the non-polar organic solvent is a homocyclic aromatic solvent.

4. The process of claim 1 wherein the non-polar organic solvent is toluene.

5. The process of claim 1 wherein the aluminum lower alkoxide is aluminum isopropoxide.

6. The process of claim 1 wherein the lower aliphatic ketone is cyclohexanone.

7. The process of claim 1 wherein the starting compound is $\Delta^5$-androstene-3$\beta$,19-diol-17-one and the final compound is $\Delta^4$-androsten-19-ol-3,17-dione.

8. The process of claim 1 wherein the starting compound is $\Delta^5$-pregnene-3$\beta$,19-diol-20-one and the final compound is $\Delta^4$-pregnen-19-ol-3,20-dione.

9. The process of claim 1 wherein the starting compound is $\Delta^{5,16}$-pregnadiene-3$\beta$,19-diol-20-one and the final compound is $\Delta^{4,16}$-pregnadien-19-ol-3,20-dione.

10. The process of claim 1 wherein the starting compound is $\Delta^5$-androstene-3$\beta$,17$\beta$,19-triol and the final compound is $\Delta^4$-androsten-19-ol-3,17-dione.

11. The process of claim 1 wherein the starting compound is 19-hydroxy diosgenin and the final compound is 19-hydroxy-diosgenone.

12. The process of claim 1 wherein the starting compound is 17$\alpha$-methyl-$\Delta^5$-androstene-3$\beta$,17$\beta$-19-triol and the final compound is 17$\alpha$-methyl-$\Delta^4$-androstene-17$\beta$,19-diol-3-one.

13. The process of claim 1 wherein the starting compound is 17$\alpha$-ethinyl-$\Delta^5$-androstene-3$\beta$,17$\beta$,19-triol and the final compound is 17$\alpha$-ethinyl-$\Delta^4$-androstene-17$\beta$,19-diol-3-one.

14. The process of claim 1 wherein the starting compound is the 17-acetate of 17$\alpha$-ethinyl-$\Delta^5$-androstene-3$\beta$,17$\beta$,19-triol and the final compound is the 17-acetate of 17$\alpha$-ethinyl-$\Delta^4$-androstene-17$\beta$,19-diol-3-one.

References Cited in the file of this patent

UNITED STATES PATENTS 2,384,335    Oppenauer ------------ Sept. 4, 1945